(12) United States Patent
Okinaga

(10) Patent No.: US 7,654,906 B2
(45) Date of Patent: Feb. 2, 2010

(54) DAMPER WITH TRIGGER PLATE

(75) Inventor: Yasushi Okinaga, Shimane (JP)

(73) Assignee: NOK Corporation (JP)

( * ) Notice: Subject to any disclaimer, the term of this patent is extended or adjusted under 35 U.S.C. 154(b) by 343 days.

(21) Appl. No.: 11/659,929

(22) PCT Filed: Aug. 24, 2005

(86) PCT No.: PCT/JP2005/015322

§ 371 (c)(1),
(2), (4) Date: Feb. 9, 2007

(87) PCT Pub. No.: WO2006/022280

PCT Pub. Date: Mar. 2, 2006

(65) Prior Publication Data

US 2007/0270227 A1 Nov. 22, 2007

(30) Foreign Application Priority Data

Aug. 24, 2004 (JP) .............................. 2004-243276

(51) Int. Cl.
*F16D 3/76* (2006.01)

(52) U.S. Cl. .......................................... 464/23; 464/90

(58) Field of Classification Search ................... 464/23, 464/29, 89, 90; 474/902
See application file for complete search history.

(56) References Cited

FOREIGN PATENT DOCUMENTS

| JP | H5-92554 U | 12/1993 |
|----|------------|---------|
| JP | H10-141441 A | 5/1998 |
| JP | H11-281312 A | 10/1999 |
| JP | 2003-148560 A | 5/2003 |

OTHER PUBLICATIONS

International Search Report for PCT/JP2005/015322, ISA/JP, mailed Dec. 13, 2005.

*Primary Examiner*—Greg Binda
(74) *Attorney, Agent, or Firm*—Harness, Dickey & Pierce P.L.C.

(57) ABSTRACT

To prevent the number of parts from being increased due to a trigger plate in a damper with trigger plate, a damper which is formed by interposing a sleeve and an elastic body between a hub fitted to a rotating shaft and an annular mass body disposed at the outer peripheral side of the hub, is characterized in that a magnetized trigger plate is integrally fitted, at specified pitch in the circular direction, to one end part of the sleeve, and the sleeve is fitted to the outer peripheral side of the hub or the inner peripheral side of the annular mass body.

7 Claims, 5 Drawing Sheets

DAMPER WITH TRIGGER PLATE

This is a national stage of the International Patent Application No. PCT/JP2005/015322 filed Aug. 24, 2005 and published in Japanese.

BACKGROUND OF THE INVENTION

1. Field of the Invention

The present invention relates to a damper absorbing a torsional vibration of a rotating shaft, and more particularly to that provided with a trigger plate for detecting a rotation angle of the rotating shaft.

2. Description of the Conventional Art

In a damper absorbing a torsional vibration of a crank shaft of an automotive engine, there has been conventionally a structure provided with a trigger plate (a sensor plate) for detecting a crank angle of a crank shaft, for example, as disclosed in patent document 1.

Patent Document 1: Japanese Unexamined Patent Publication No. 11-281312

The trigger plate described in the patent document 1 is manufactured by a punching press from a magnetic material metal plate, and is structured such that a desired number of detected projections are formed at a predetermined pitch in a circumferential direction along an outer peripheral edge. On the other hand, a magnetic sensor (a crank angle sensor) is arranged at one position in the circumferential direction at an outer peripheral side of the trigger plate in a non-rotating state, and is structured such as to detect a crank angle for triggering an engine ignition apparatus and a fuel injection apparatus, by reading passage of the detected projections rotating together with the crank shaft.

However, in accordance with the prior art mentioned above, since the trigger plate is constituted by a substantially different member from the constituting parts of the damper, an increase of the number of parts of the damper is caused.

SUMMARY OF THE INVENTION

Problem to be Solved by the Invention

The present invention is made by taking the points mentioned above into consideration, and a technical object of the present invention is to provide a damper with a trigger plate which does not cause an increase of the number of parts due to the trigger plate.

Means for Solving the Problem

As a means for effectively achieving the technical object mentioned above, in accordance with a first aspect of the present invention, there is provided a damper with a trigger plate in which a sleeve and an elastic body are interposed between a hub attached to a rotating shaft and an annular mass body arranged at an outer peripheral side of the hub, wherein the trigger plate magnetized at a predetermined pitch in a circumferential direction is integrally provided on one end portion of the sleeve.

Further, in accordance with a second aspect of the present invention, there is provided a damper with a trigger plate as recited in the first aspect, wherein the sleeve is fitted to an outer peripheral side of the hub.

Further, in accordance with a third aspect of the present invention, there is provided a damper with a trigger plate as recited in the first aspect, wherein the sleeve is fitted to an inner peripheral side of the annular mass body.

EFFECT OF THE INVENTION

In accordance with the damper with the trigger plate in accordance with each of the aspects of the present invention, since the trigger plate is integrally provided on the sleeve corresponding to the constituting part of the damper, the number of parts of the damper and an assembling man hour are not increased, and it is possible to firmly fix the trigger plate in accordance with press insertion of the sleeve.

BRIEF EXPLANATION OF DRAWING

FIGS. 1A and 1B show a first embodiment of a damper with a trigger plate in accordance with the present invention, in which FIG. 1A is a half cross sectional view showing by cutting by a plane passing through an axis, and FIG. 1B is a partial view in a direction of an arrow B in FIG. 1A;

FIGS. 2A and 2B show a second embodiment of the damper with the trigger plate in accordance with the present invention, in which FIG. 2A is a half cross sectional view showing by cutting by a plane passing through an axis, and FIG. 2B is a partial view in a direction of an arrow B in FIG. 2A;

FIGS. 3A and 3B show a third embodiment of the damper with the trigger plate in accordance with the present invention, in which FIG. 3A is a half cross sectional view showing by cutting by a plane passing through an axis, and FIG. 3B is a partial perspective view;

Figure 1A:
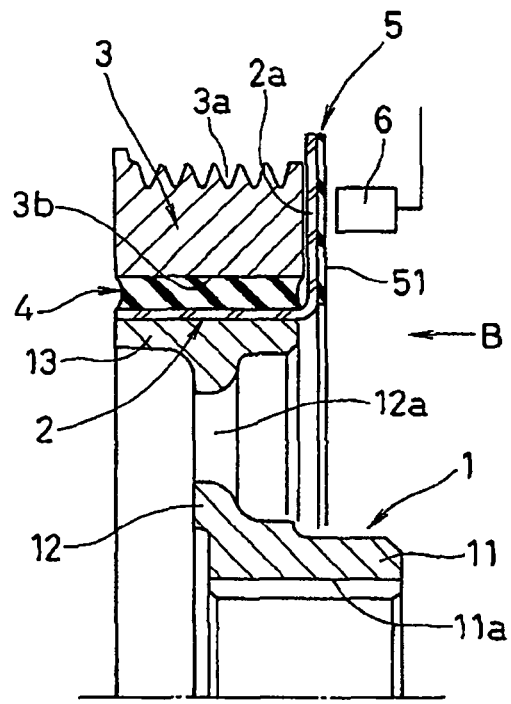

DESCRIPTION OF REFERENCE NUMERALS 1 hub
11 boss portion
12 radial portion
12a window portion
13 rim portion
2 sleeve
2a outward collar portion
2b inward collar portion
2c end portion
3 annular mass body
3a multi v groove
3b inner peripheral surface
4 elastic body
5 trigger plate
51 magnetized layer
51a magnetic pole
51a' crank angle measurement starting point
6 magnetic sensor

DETAILED DESCRIPTION OF PREFERRED EMBODIMENT

First Embodiment

Figure 1B:
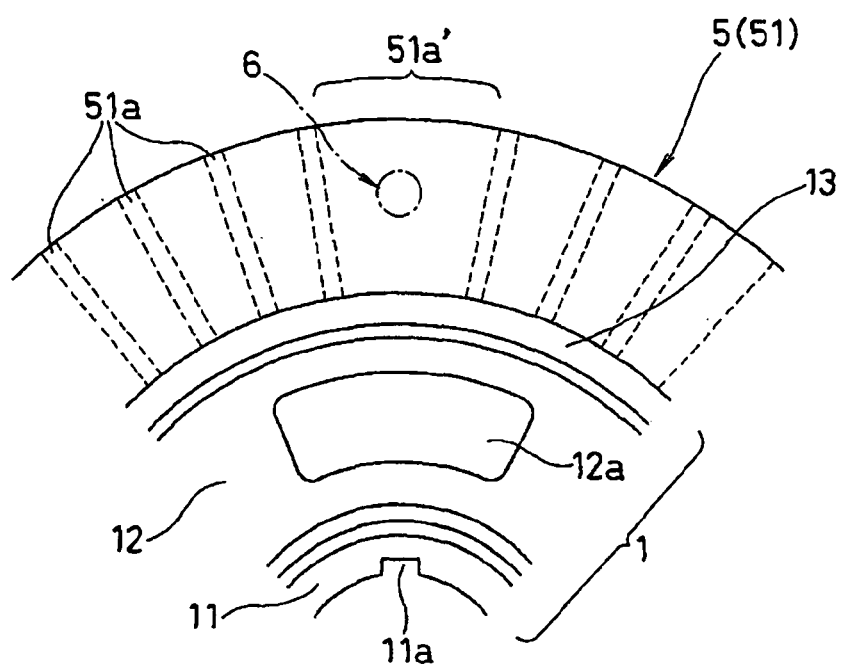

A description will be given below of a preferable embodiment of a damper with a trigger plate in accordance with the present invention with reference to the accompanying drawings. First, FIGS. 1A and 1B show a first embodiment of the damper with the trigger plate in accordance with the present invention, in which FIG. 1A is a half cross sectional view showing by cutting by a plane passing through an axis, and FIG. 1B is a partial view in a direction of an arrow B in FIG. 1A. In the following description, "front surface" corresponds to a left side in FIG. 1A or FIGS. 2A, 3A and 4 mentioned below, and "back surface" corresponds to an opposite side thereto and a side at which an engine (not shown) exists.

In FIG. 1, reference numeral 1 denotes a hub attached to a front surface end portion of a crank shaft (not shown) of an automotive engine, reference numeral 2 denotes a sleeve press-fitted inserted to an outer peripheral surface of a rim portion 13 in the hub 1, reference numeral 3 denotes an annular mass body concentrically arranged at an outer peripheral side of the sleeve 2, reference numeral 4 denotes an elastic body interposed between the sleeve 2 and the annular mass body 3, and reference numeral 5 denotes a trigger plate integrally provided on the sleeve 2 and magnetized at a predetermined pitch in a circumferential direction.

The hub 1 is manufactured by a metal material, and is constituted by a cylindrical boss portion 11 fixed to a front surface end portion of the crank shaft via a center bolt (not shown), a radial portion 12 extending to an outer peripheral side from the boss portion 11, and a cylindrical rim portion 13 formed on an outer periphery thereof. In this case, the radial portion 12 is provided with a plurality of window portions 12a at a predetermined interval in a circumferential direction for the purpose of weight reduction. Further, reference symbol 11a denotes a key groove formed in an inner periphery of the boss portion 11.

The annular mass body 3 is manufactured by a metal material such as a cast iron, a steel product or the like, and multi v grooves 3a are formed on an outer peripheral surface thereof for winding endless belts transmitting rotating force to an engine auxiliary machine (not shown).

The sleeve 2 is manufactured by punching a metal plate of a magnetic body such as a steel plate or the like, is formed in a cylindrical shape, and is press-fitted to an outer peripheral surface of the rim portion 13 in the hub 1 with a desired fastening margin.

The elastic body 4 is formed in an annular shape by a rubber-like elastic material, and is vulcanized and bonded to and between an inner peripheral surface 3b of the annular mass body 3 and the sleeve 2.

An outward collar portion 2a expanded in a disc shape to an outer peripheral side is extended from an end portion at a back surface side of the sleeve 2. In other words, the outward collar portion 2a is constituted by a magnetic body metal plate made of the same material as that of the sleeve 2, and is extended in a vertical direction to an axis with a suitable gap with respect to an end surface at a back surface side of the annular mass body 3. Further, the trigger plate 5 is constituted by the outward collar portion 2a and a magnetized layer 51 bonded to a back surface thereof.

The magnetized layer 51 in the trigger plate 5 is made of a rubber-like elastic material or a synthetic resin material obtained by uniformly mixing fine powder of a magnetic body such as ferrite or the like, and bonded to a back surface of the outward collar portion 2a extending from the sleeve 2 in accordance with a vulcanization bonding or the like, and different magnetic poles (S poles and N poles) 51a are alternately magnetized at a predetermined pitch in a circumferential direction.

In this case, as shown in FIG. 1B, the trigger plate 5 is provided with a crank angle measurement starting point 51a' for detecting a specific position, for example, a top dead center of a piston of an engine or the like, and the crank angle measurement starting point 51a' is formed by setting a portion having a different magnetized pitch of the magnetic poles 51a or the like at one position in the circumferential direction.

Further, a magnetic sensor 6 constituted by a Hall element, a magnetic resistance element or the like is arranged at a back surface side of the trigger plate 5 in a non-rotating state, and a detecting surface is close to and faces to the magnetized layer 51 constituting a main body of the trigger plate 5 in an axial direction. Further, a rotary encoder detecting a crank angle of a crank shaft for an engine ignition timing control and a fuel injection timing control is structured by the triggerplate 5 and the magnetic sensor 6.

The elastic body 4 and the annular mass body 3 structure a spring-mass system (a sub vibration system) and a torsional direction natural frequency thereof is set to a vibration frequency band having a maximum amplitude of a torsional vibration of the crank shaft, by an inertial mass in a circumferential direction of the annular mass body 3, and a shear spring constant in a circumferential direction of the elastic body 4.

The damper with the trigger plate provided with the structure mentioned above is fitted to a front surface end portion of the crank shaft in a boss portion 11 of the hub 1, and is integrally rotated with the crank shaft. Thus, with respect to a frequency of a torsional vibration input from the crank shaft via the hub 1, in a rotating speed range in which amplitude of the crank shaft becomes maximum, the sub vibration system constituted by the annular mass body 3 and the elastic body 4 resonates in a torsional direction at an inverse phase angle to the input vibration, that is, a torque caused by the resonance is generated in an inverse direction to a torque of the input vibration (a dynamic vibration absorbing effect). Accordingly, it is possible to effectively lower a peak of the torsional vibration of the crank shaft.

Further, since the N poles and the S poles magnetized in the magnetized layer 51 of the trigger plate 5 alternately pass through a front surface of the detecting surface of the magnetic sensor 6 in accordance that the trigger plate 5 integrally rotates with the hub 1, the magnetic sensor 6 generates a pulse signal having a corresponding waveform to a change of a magnetic field. This signal is output as a crank angle data for an engine ignition timing control and a fuel injection timing control to an engine control unit (not shown).

In manufacturing of the damper with the trigger plate in accordance with the first embodiment shown in FIG. 1, for example, the magnetized layer 51 is first integrally vulcanized and formed on the outward collar portion 2a formed on the sleeve 2, by an unvulcanized rubber-like elastic material or a synthetic resin material obtained by uniformly mixing the fine powder of the magnetic body, the elastic body 4 is next integrally vulcanized and formed between the concentrically set sleeve 2 and annular mass body 3 by the unvulcanized rubber-like elastic material, and the integrally formed product obtained by the steps is press-fitted to an outer periphery of the rim portion 13 of the hub 1 in the sleeve 2. The sleeve 2 is expanded and deformed in a press-fitting process to the rim portion 13, whereby the elastic body 4 is previously compressed in a radial direction with respect to the annular mass body 3. Accordingly, residual tensile force caused by a volumetric shrinkage generated in the elastic body 4 in the forming process is lowered or canceled. Further, while it is necessary to apply multipolar magnetization to the magnetized layer 51, the magnetizing step may be executed before being incorporated in the hub 1 or after being incorporated in the hub 1, and the magnetized layer 51 may be formed after forming the elastic body 4.

Since the trigger plate 5 is integrally formed with the sleeve 2 fixing the sub vibration system constituted by the annular mass body 3 and the elastic body 4 to the hub 1, the number of parts is not increased by the trigger plate 5, and a mounting of the trigger plate 5 is simultaneously executed by the press-fitting step mentioned above. Further, since the trigger plate 5 can be firmly fixed via the sleeve 2, it is possible to securely prevent reliability of crank angle detection by the magnetic sensor 6 from being deteriorated due to generation of relative rotation caused by a slip with the hub 1, or securely prevent the trigger plate 5 from coming off from the hub 1.

Second Embodiment

Figure 2A:
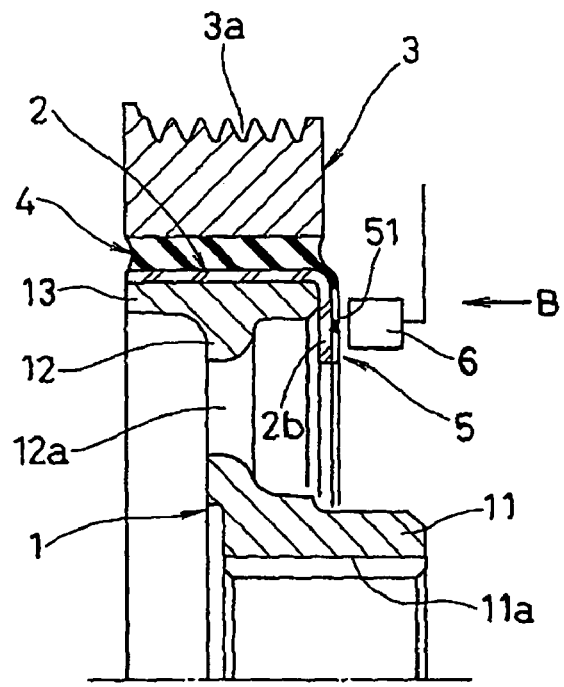
Figure 2B:
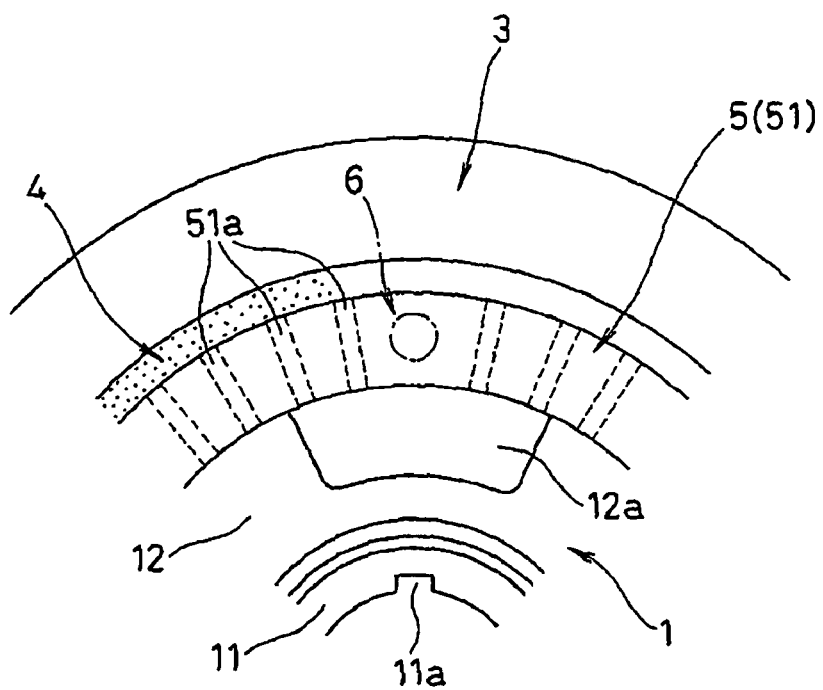

Next, FIGS. 2A and 2B show a second embodiment of the damper with the trigger plate in accordance with the present invention, in which FIG. 2A is a half cross sectional view showing by cutting by a plane passing through an axis, and FIG. 2B is a partial view in a direction of an arrow B in FIG. 2A.

The second embodiment shown in FIG. 2 is different from the first embodiment shown in FIG. 1 previously explained, in a point that the magnetized layer 51 in the trigger plate 5 is integrally bonded to the back surface of an inward collar portion 2b integrally formed from an end portion at a back surface side of the sleeve 2 to an inner peripheral side. Accordingly, the trigger plate 5 and the magnetic sensor 6 arranged so as to face to the trigger plate 5 are positioned at an inner peripheral side relatively in comparison with FIG. 1. The other structures are basically the same as those of FIG. 1.

The damper with the trigger plate in accordance with this embodiment is manufactured in the same manner as that of the first embodiment. In other words, for example, the magnetized layer 51 is first integrally vulcanized and formed in the inward collar portion 2b formed in the sleeve 2, by the unvulcanized rubber-like elastic material or the synthetic resin material obtained by uniformly mixing the fine powder of the magnetic body, the elastic body 4 is next integrally vulcanized and formed between the concentrically set sleeve 2 and annular mass body 3 by the unvulcanized rubber-like elastic material, and the integrally formed product obtained by the steps is press-fitted to an outer periphery of the rim portion 13 of the hub 1 in the sleeve 2. The magnetizing step to the magnetized layer 5 may be executed before being incorporated in the hub 1 or after being incorporated in the hub 1, and the magnetized layer 51 may be formed after forming the elastic body 4.

The magnetic body powder mixed rubber-like elastic material or the synthetic resin material used for the magnetized layer 51 is expensive, however, in accordance with this embodiment, since the trigger plate 5 has a small diameter, and a circumference thereof is short, it is possible to reduce a material cost of the magnetized layer 51 in comparison with the embodiment in FIG. 1.

Third Embodiment

Figure 3A:
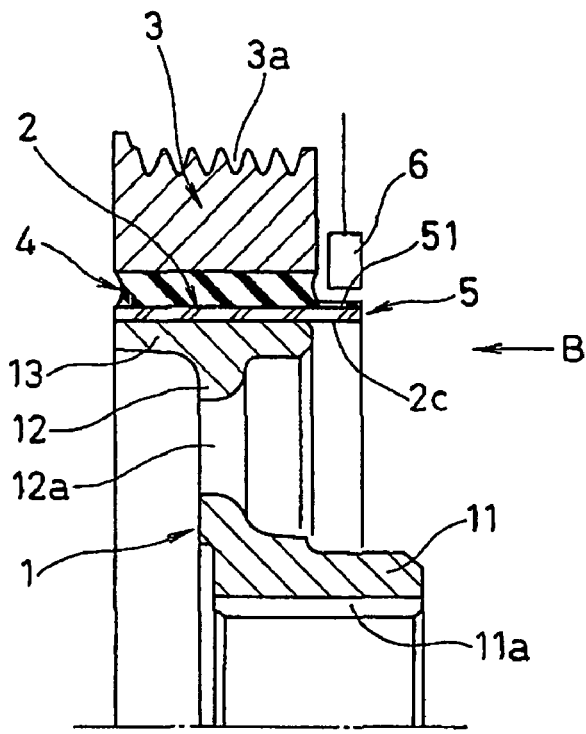
Figure 3B:
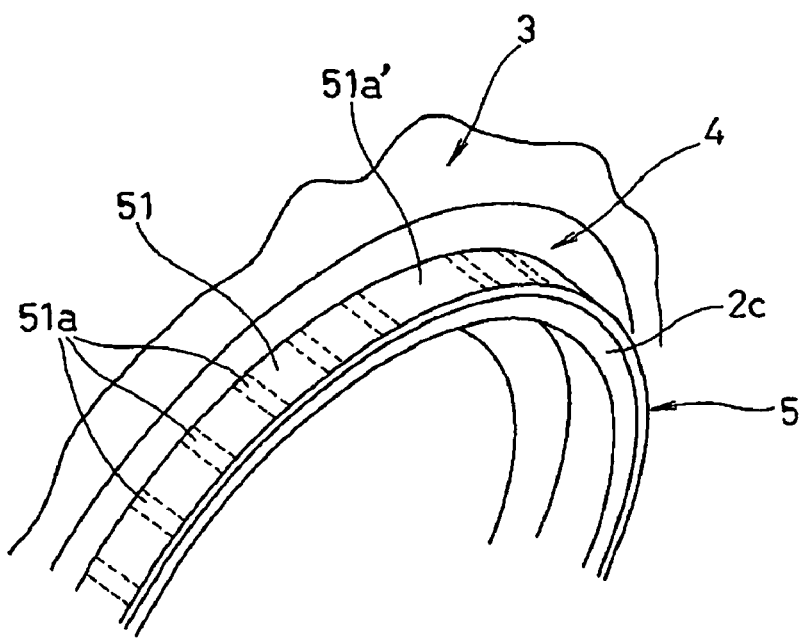

Next, FIGS. 3A and 3B show a third embodiment of the damper with the trigger plate in accordance with the present invention, in which FIG. 3A is a half cross sectional view showing by cutting by a plane passing through an axis, and FIG. 3B is a partial view.

The third embodiment shown in FIG. 3 is different from the first embodiment shown in FIG. 1 and the second embodiment shown in FIG. 2 previously explained, in a point that the magnetized layer 51 in the trigger plate 5 is integrally formed in an outer peripheral surface of an end portion 2c protruding to a back surface side from the bonded portion to the elastic body 4 in the sleeve 2, that is, the magnetized layer 51 is formed in a cylindrical shape, and the magnetic sensor 6 is arranged so as to face to the outer peripheral surface of the magnetized layer 51 in a radial direction. The other structures are basically the same as those of FIG. 1 or FIG. 2.

The damper with the trigger plate in accordance with this embodiment is manufactured in the same manner as that of the first embodiment. In other words, for example, the magnetized layer 51 is first integrally vulcanized and formed on the outer peripheral surface of the end portion 2c of the sleeve 2, by the unvulcanized rubber-like elastic material or the synthetic resin material obtained by uniformly mixing the fine powder of the magnetic body, the elastic body 4 is next integrally vulcanized and formed between the concentrically set sleeve 2 and annular mass body 3 by the unvulcanized rubber-like elastic material, and the integrally formed product obtained by the steps is press-fitted to an outer periphery of the rim portion 13 of the hub 1 in the sleeve 2. The magnetizing step to the magnetized layer 51 may be executed before being incorporated in the hub 1 or after being incorporated in the hub 1, and the magnetized layer 51 may be formed after forming the elastic body 4.

Further, in this embodiment, since the trigger plate 5 has a small diameter and the circumference thereof is short, it is possible to reduce the material cost of the magnetized layer 51 in comparison with the embodiment in FIG. 1.

Fourth Embodiment

Figure 4:
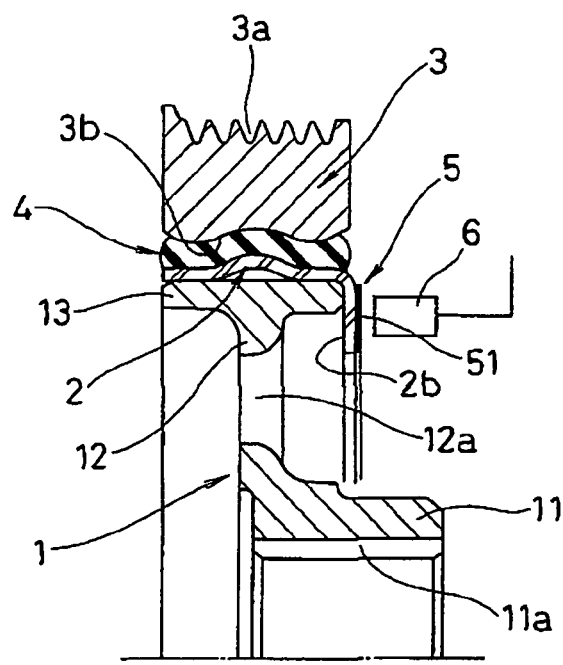
FIG. 4 is a half cross sectional view showing a fourth embodiment of the damper with the trigger plate in accordance with the present invention by cutting by a plane passing through an axis.

Each of the embodiments mentioned above is structured such that the present invention is applied to the so-called bush type damper in which the elastic body 4 is integrally vulcanized and formed between the sleeve 2 press-fitted to the rim portion 13 of the hub 1, and the annular mass body 3 arranged at the outer periphery thereof, however, the present invention can be applied to a so-called fitting type damper in which a previously annularly formed elastic body 4 is press inserted. FIG. 4 is a half cross sectional view showing a fourth embodiment of the damper with the trigger plate in accordance with the present invention, by cutting by a plane passing through an axis, as an example of the one mentioned above.

In the fourth embodiment shown in FIG. 4, the difference from each of the embodiments described above exists in a point that the elastic body 4 is press inserted and fitted to the portion between the sleeve 2 and the annular mass body 3 arranged at the outer periphery thereof.

In detail, in an inner peripheral surface 3b of the annular mass body 3, a cross sectional shape (a cross sectional shape shown in FIG. 4) cut by the plane passing through the axis is formed in such a shape that an intermediate portion in the axial direction is depressed to an outer peripheral side so as to draw a curved surface. On the other hand, in the sleeve 2, a cross sectional shape (a cross sectional shape shown in FIG. 4) cut by the plane passing through the axis is formed in such a shape that an intermediate portion in an axial direction is expanded to an outer peripheral side so as to draw a curved surface, in correspondence to the inner peripheral surface 3b of the annular mass body 3, and both ends in the axial direction and portions near. the same are fitted to a cylindrical surface shaped outer peripheral surface of the rim portion 13 in the hub 1 with a suitable fastening margin.

The annular elastic body 4 is previously formed in an annular shape (a cylindrical shape) by a rubber-like elastic material, and is press-inserted and fitted to the portion between the inner peripheral surface 3$b$ of the annular mass body 3 and the sleeve 2. The annular elastic body 4 is formed in such a cross sectional shape that an intermediate portion in an axial direction is serpentine to an outer peripheral side so as to draw the curved surface, along the inner peripheral surface 3$b$ of the annular mass body 3 and sleeve 2 facing thereto in a radial direction, thereby preventing a slip with respect to the inner peripheral surface 3$b$ of the annular mass body 3 and the sleeve 2.

The trigger plate 5 is structured, in the same manner as the second embodiment shown in FIG. 2 described above, such that the magnetized layer 51 in the trigger plate 5 is integrally bonded to the back surface of the inward collar portion 2$b$ integrally formed from the end portion at the back surface side of the sleeve 2 to the inner peripheral side, and the different magnetic poles (the S poles and the N poles) are magnetized in the magnetized layer 51 at a predetermined pitch alternately in the circumferential direction.

The damper with trigger plate of the fourth embodiment is fitted to the front surface end portion of the crank shaft so as to be integrally rotated with the crank shaft in the same manner as each of the embodiments mentioned above, and is structured such that the subvibration system constituted by the annular mass body 3 and the elastic body 4 effectively lower the peak of the torsional vibration of the crank shaft on the basis of the dynamic vibration absorbing effect of resonating in the torsional direction at the inverse phase angle to the input vibration, in the rotating speed range in which the amplitude of the torsional vibration of the crank shaft becomes maximum. Further, since the trigger plate 5 is integrally rotated with the hub 1, the magnetic sensor 6 arranged at the back surface side thereof outputs the pulse signal forming the crank angle data for triggering the engine ignition apparatus and the fuel injection apparatus.

In the manufacture of the damper with the trigger plate shown in FIG. 4, the magnetized layer 51 is first vulcanized and integrally formed on the back surface of the inward collar portion 2$b$ of the sleeve 2, by the unvulcanized rubber-like elastic material or the synthetic resin material obtained by uniformly mixing the fine powder of the magnetic body. Next, the annular mass body 3 is concentrically arranged at the outer peripheral side of the sleeve 2, and the elastic body 4 previously formed in the annular shape (the cylindrical shape) by the rubber-like elastic material is press-inserted in the axial direction to a portion between the inner peripheral surface 3$b$ of the annular mass body 3 and the sleeve 2. In this case, it is preferable to previously coat a coupling agent for increasing a slip torque between the fitted surfaces on the outer peripheral surface of the sleeve 2 and the inner peripheral surface 3$b$ of the annular mass body 3 or the elastic body 4.

In the press-inserting process of the elastic body 4, since the sleeve 2 is elastically deformed slightly to the inner peripheral side by being pressed by the elastic body 4, the press-insertion resistance becomes small, and it is accordingly possible to easily execute the press-inserting work. After press-inserting the elastic body 4, the sleeve 2 of the inner periphery thereof is press-fitted to the outer peripheral surface of the rim portion 13 in the hub 1. Since a suitable fastening margin with respect to the rim portion 13 is set in the sleeve 2, and the sleeve 2 is slightly contracted and deformed by press-insertion of the elastic body 4, a compression reaction force of the elastic body 4 is applied as the fastening force to the fitted surfaces between the sleeve 2 and the rim portion 13, in addition to the fastening margin. Therefore, a firm fitted state is achieved. Accordingly, since the trigger plate 5 integrally formed with the sleeve 2 is firmly fixed, and the elastic body 4 is compressed in the radial direction in accordance with the press-fitting of the sleeve 2 to the rim portion 13, a fitting force of the elastic body 4 to the sleeve 2 and the annular mass body 3 is improved.

Further, in this embodiment, since the trigger plate 5 is integrally formed with the sleeve 2 fixing the sub vibration system constituted by the annular mass body 3 and the elastic body 4, the number of parts is not increased by the trigger plate 5, and the trigger plate 5 is simultaneously attached by press-fitting of the sleeve 2. Further, since the trigger plate 5 is firmly fixed via the sleeve 2 as mentioned above, it is possible to securely prevent the reliability of the crank angle detection by the magnetic sensor 6 from being deteriorated due to the generation of the relative rotation caused by the slip with the hub 1, or securely prevent the trigger plate 5 from coming off from the hub 1.

Further, the trigger plate 5 can be structured such as to be expanded in a collar shape from the sleeve 2 to the outer peripheral side as shown in FIG. 1, or be formed in a cylindrical shape on the end portion 2$c$ at the back surface side of the sleeve 2 as shown in FIG. 3, in addition to the structure shown in FIG. 4.

Fifth Embodiment

In the first to fourth embodiments mentioned above, the sleeve 2 is fitted (press-fitted) to the outer peripheral side of the hub 1. On the contrary, in the fifth embodiment, the sleeve 2 is fitted (press-inserted and fitted) to the inner peripheral side of the annular mass body 3.

Figure 5:
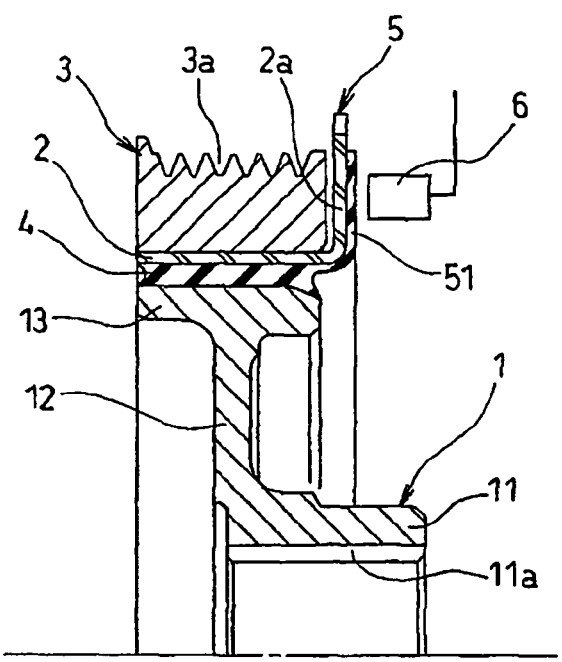
FIG. 5 is a half cross sectional view showing a fifth embodiment of the damper with the trigger plate in accordance with the present invention by cutting by a plane passing through an axis.

In FIG. 5 in accordance with the fifth embodiment, reference numeral 1 denotes a hub attached to a front surface end portion of a crank shaft (not shown) of an automotive engine, reference numeral 3 denotes an annular mass body concentrically arranged at an outer peripheral side of the hub 1, reference numeral 2 denotes a sleeve fitted (press-inserted and fitted) to an inner peripheral surface of the annular mass body 3, reference numeral 4 denotes an elastic body interposed between the hub 1 and the sleeve 2, and reference numeral 5 denotes a trigger plate integrally provided on the sleeve 2 and magnetized at a predetermined pitch in a circumferential direction.

The hub 1 is manufactured by a metal material, and is constituted by a cylindrical boss portion 11 fixed to a front surface end portion of the crank shaft via a center bolt (not shown), a radial portion 12 extending to an outer peripheral side from the boss portion 11, and a cylindrical rim portion 13 formed on an outer periphery thereof. Further, reference symbol 11$a$ denotes a key groove formed in an inner periphery of the boss portion 11.

The annular mass body 3 is manufactured by a metal material such as a cast iron, a steel product or the like, and multi v grooves 3$a$ are formed on an outer peripheral surface thereof for winding endless belts transmitting rotating force to an engine auxiliary machine (not shown).

The sleeve 2 is manufactured by punching a metal plate of a magnetic body such as a steel plate or the like, is formed in a cylindrical shape, and is press-inserted and fitted to an inner peripheral surface of the annular mass body 3 with a desired fastening margin.

The elastic body 4 is formed in an annular shape by a rubber-like elastic material, is arranged between an outer peripheral surface of the rim portion 13 of the hub 1 and an inner peripheral surface of the sleeve 2, and is vulcanized and bonded to both the surfaces.

An end portion at a back surface side of the sleeve 2 is extended in an axial direction, and an outward collar portion 2a expanded in a disc shape to an outer side in a radial direction from a leading end portion thereof is extended. In other words, the outward collar portion 2a is constituted by a magnetic body metal plate made of the same material as that of the sleeve 2, and is extended in a vertical direction to an axis with a suitable gap with respect to an end surface at a back surface side of the annular mass body 3. Further, the trigger plate 5 is constituted by the outward collar portion 2a and a magnetized layer 51 bonded to a back surface thereof.

The magnetized layer 51 in the trigger plate 5 is made of a rubber-like elastic material or a synthetic resin material obtained by uniformly mixing a fine powder of a magnetic body such as a ferrite or the like, and bonded to a back surface of the outward collar portion 2a extending from the sleeve 2 in accordance with a vulcanization bonding or the like, and different magnetic poles (S poles and N poles) 51a are alternately magnetized at a predetermined pitch in a circumferential direction, in the same manner as each of the first to fourth embodiments mentioned above.

In this case, the trigger plate 5 is provided with a crank angle measurement starting point for detecting a specific position, for example, a top dead center of a piston of an engine or the like, and the crank angle measurement starting point is formed by setting a portion having a different magnetized pitch of the magnetic poles or the like at one position in the circumferential direction.

Further, a magnetic sensor 6 constituted by a Hall element, a magnetic resistance element or the like is arranged at a back surface side of the trigger plate 5 in a non-rotating state, and a detecting surface is close to and faces to the magnetizing layer 51 constituting a main body of the trigger plate 5 in an axial direction. Further, a rotary encoder detecting a crank angle of a crank shaft for an engine ignition timing control and a fuel injection timing control is structured by the trigger plate 5 and the magnetic sensor 6.

The elastic body 4, the sleeve 2 and the annular mass body 3 structure a spring-mass system (a sub vibration system), and a torsional direction natural frequency thereof is set to a vibration frequency band having a maximum amplitude of a torsional vibration of the crank shaft, by an inertial mass in a circumferential direction of the sleeve 2 and the annular mass body 3, and a shear spring constant in a circumferential direction of the elastic body 4.

The damper with the trigger plate provided with the structure mentioned above is fitted to a front surface end portion of the crank shaft in a boss portion 11 of the hub 1, and is integrally rotated with the crank shaft. Thus, with respect to a frequency of a torsional vibration input from the crank shaft via the hub 1, in a rotating speed range in which amplitude of the crank shaft becomes maximum, the sub vibration system constituted by the annular mass body 3, the sleeve 2 and the elastic body 4 resonates in a torsional direction at an inverse phase angle to the input vibration, that is, a torque caused by the resonance is generated in an inverse direction to a torque of the input vibration (a dynamic vibration absorbing effect). Accordingly, it is possible to effectively lower a peak of the torsional vibration of the crank shaft.

Further, since the N poles and the S poles magnetized in the magnetized layer 51 of the trigger plate 5 alternately pass through a front surface of the detecting surface of the magnetic sensor 6 in accordance that the trigger plate 5 integrally rotates with the annular mass body 3, the magnetic sensor 6 generates a pulse signal having a corresponding waveform to a change of a magnetic field. This signal is output as a crank angle data for an engine ignition timing control and a fuel injection timing control to an engine control unit (not shown).

In manufacturing of the damper with the trigger plate in accordance with the fifth embodiment shown in FIG. 5 mentioned above, for example, the magnetized layer 51 is first integrally vulcanized and formed on the outward collar portion 2a formed on the sleeve 2, by an unvulcanized rubber-like elastic material or a synthetic resin material obtained by uniformly mixing the fine powder of the magnetic body, the elastic body 4 is next integrally vulcanized and formed between the concentrically set hub 1 and sleeve 2 by the unvulcanized rubber-like elastic material, and the integrally formed product obtained by the steps is press-inserted to an inner peripheral side of the annular mass body 3 in the sleeve 2 from one side in an axial direction. The sleeve 2 is contracted and deformed in a press inserting process to inner peripheral side of the annular mass body 3, whereby the elastic body 4 is previously compressed in a radial direction with respect to the hub 1. Accordingly, residual tensile force caused by a volumetric shrinkage generated in the elastic body 4 in the forming process is lowered or canceled. Further, while it is necessary to apply multipolar magnetization to the magnetized layer 51, the magnetizing step maybe executed before the annular mass body 3 is incorporated or after the annular mass body 3 is incorporated, and the magnetized layer 51 may be formed after forming the elastic body 4.

In the fifth embodiment mentioned above, since the trigger plate 5 is integrally formed with the sleeve 2 constituting a part of the sub vibration system, the number of parts of the damper is not increased by the provision of the trigger plate 5, and a mounting of the trigger plate 5 is simultaneously executed by the press-inserting step mentioned above. Further, since the trigger plate 5 can be firmly fixed to the hub 1 via the elastic body 4 and the sleeve 2, it is possible to securely prevent reliability of crank angle detection by the magnetic sensor 6 from being deteriorated, or securely prevent the trigger plate 5 from coming off from the hub 1.

Sixth Embodiment

Figure 6:
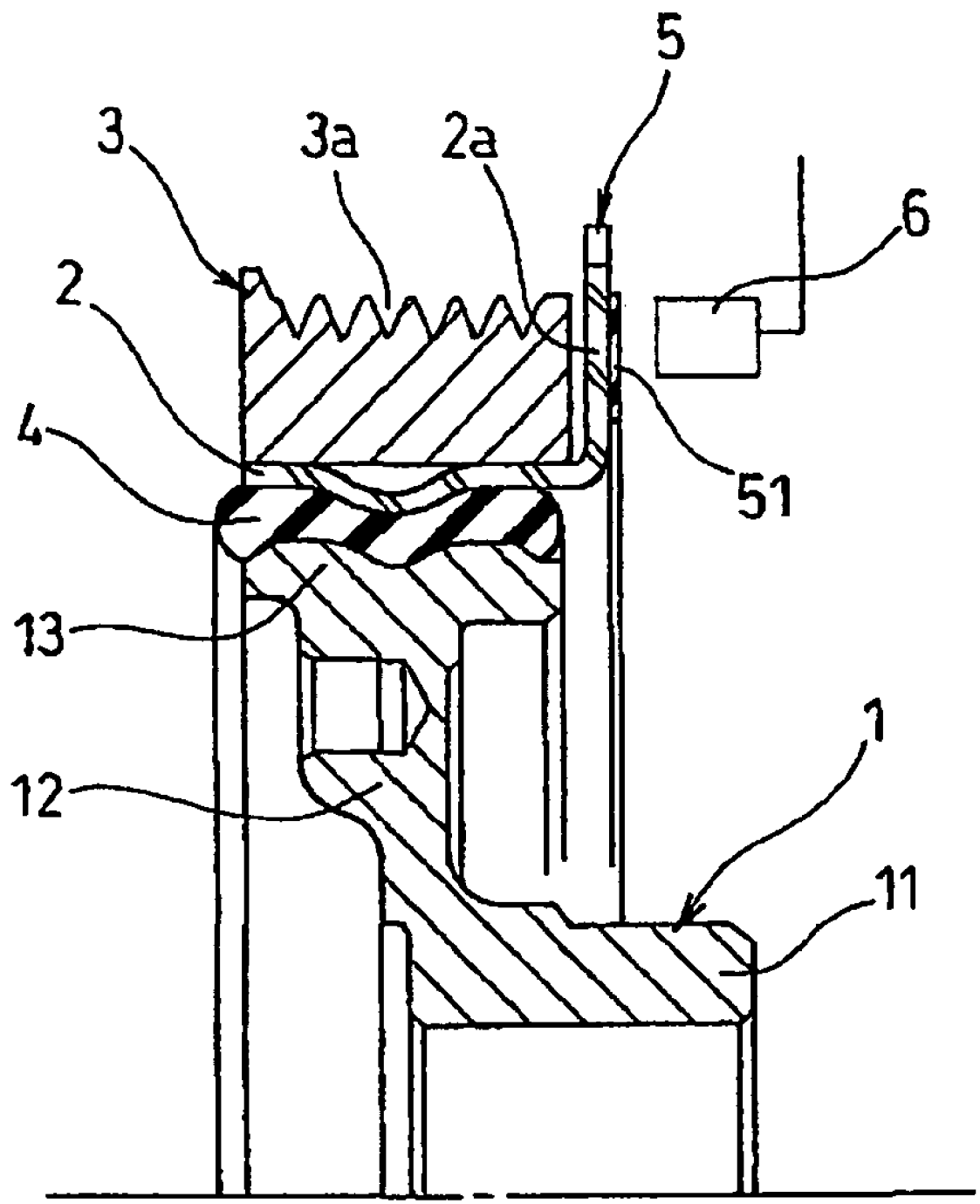
FIG. 6 is a half cross sectional view showing a sixth embodiment of the damper with the trigger plate in accordance with the present invention by cutting by a plane passing through an axis.

The fifth embodiment mentioned above is structured such that the present invention is applied to the damper of the type in which the elastic body 4 is integrally vulcanized and formed between the outer peripheral surface of the hub 1 and the inner peripheral surface of the sleeve 2 fitted to the inner peripheral side of the annular mass body 3 arranged at the outer peripheral side of the hub 1, however, the present invention can be applied to a so-called fitting type damper in which a previously independently annularly formed elastic body 4 is press inserted. FIG. 6 is a half cross sectional view showing a sixth embodiment of the damper with the trigger plate in accordance with the present invention, by cutting by a plane passing through an axis, as an example mentioned above.

In the sixth embodiment shown in FIG. 6, the difference from the fifth embodiment described above exists in a point that the independently annularly formed elastic body 4 is press-inserted and fitted to the portion between the hub 1 and the sleeve 2.

In more detail, in an outer peripheral surface of the rim portion 13 of the hub 1, a cross sectional shape (a cross sectional shape shown in FIG. 6) cut by the plane passing through the axis is formed in such a shape that an intermediate portion in the axial direction is depressed to an inner peripheral side so as to draw a curved surface. On the other hand, in the sleeve 2, a cross sectional shape (a cross sectional shape shown in FIG. 6) cut by the plane passing through the axis is formed in such a shape that an intermediate portion in an axial direction is expanded to an inner peripheral side so as to draw a curved surface, in correspondence to the outer peripheral surface of the rim portion 13 of the hub 1, and both ends in the axial direction and portions near the same are fitted to a cylindrical surface shaped inner peripheral surface of the mass body 3 with a suitable fastening margin.

The annular elastic body 4 is previously formed in an annular shape (a cylindrical shape) by a rubber-like elastic material, and is press-inserted and fitted to the portion between the rim 13 of the hub 1 and the sleeve 2. The annular elastic body 4 is formed in such a cross sectional shape that an intermediate portion in an axial direction is serpentine to an inner peripheral side so as to draw the curved surface, along the outer peripheral surface of the rim portion 13 of the hub 1 and the inner peripheral surface of the sleeve 2 facing thereto in a radial direction, thereby preventing a slip with respect to the outer peripheral surface of the rim portion 13 of the hub 1 and the inner peripheral surface of the sleeve 2.

The trigger plate 5 is structured, in the same manner as the fifth embodiment mentioned above, such that the magnetized layer 51 in the trigger plate 5 is integrally bonded to the back surface of the outward collar portion 2a integrally formed from the end portion at the back surface side of the sleeve 2 to the outer peripheral side, and the different magnetic poles (the S poles and the N poles) are magnetized in the magnetized layer 51 at a predetermined pitch alternately in the circumferential direction.

The damper with trigger plate of the sixth embodiment is fitted to the front surface end portion of the crank shaft so as to be integrally rotated with the crank shaft in the same manner as the fifth embodiment mentioned above, and is structured such that the sub vibration system constituted by the annular mass body 3, the sleeve 2 and the elastic body 4 effectively lower the peak of the torsional vibration of the crank shaft on the basis of the dynamic vibration absorbing effect of resonating in the torsional direction at the inverse phase angle to the input vibration, in the rotating speed range in which the amplitude of the torsional vibration of the crank shaft becomes maximum. Further, since the trigger plate 5 is integrally rotated with the annular mass body 3, the magnetic sensor 6 arranged at the back surface side thereof outputs the pulse signal forming the crank angle data for triggering the engine ignition apparatus and the fuel injection apparatus.

In the manufacture of the damper with the trigger plate shown in FIG. 6, the magnetized layer 51 is first vulcanized and integrally formed on the back surface of the outward collar portion 2a of the sleeve 2, by the unvulcanized rubber-like elastic material or the synthetic resin material obtained by uniformly mixing the fine powder of the magnetic body. Next, the sleeve 2 is concentrically arranged at the outer peripheral side of rim portion 13 of the hub 1, the elastic body 4 is press-inserted to the portion between both the elements 2 and 13 from one side in the axial direction, and an assembly constituted by the hub 1, the elastic body 4 and the sleeve 2 is assembled. Next, the annular mass body 3 is press-fitted to the outer peripheral side of the sleeve 2 in the assembly mentioned above from one side in the axial direction, and the assembling step of the damper is finished.

In this case, in the press-inserting process of the elastic body 4, it is preferable to previously coat a coupling agent for increasing a slip torque on the outer peripheral surface of the rim portion 13 of the hub 1 and/or the inner peripheral surface of the sleeve 2 corresponding to the fitted surfaces, whereby it is possible to easily execute the press-inserting process.

In the sixth embodiment mentioned above, since the trigger plate 5 is integrally formed with the sleeve 2 constituting a part of the sub vibration system mentioned above, the number of parts of the damper is not increased even if the trigger plate 5 is provided, and the trigger plate 5 is simultaneously attached by the press-fitting process mentioned above. Further, since the trigger plate 5 is firmly fixed to the hub 1 via the elastic body 4 and the sleeve 2, it is possible to securely prevent the reliability of the crank angle detection by the magnetic sensor 6 from being deteriorated, or securely prevent the trigger plate 5 from coming off from the hub 1.

In this case, in common with the fifth and sixth embodiments mentioned above, the structure may be made such that an inward collar portion is integrally formed in the sleeve 2 in place of the outward collar portion 2a, thereby forming the inward trigger plate. Accordingly, it is possible to achieve a diameter reduction of the damper.

What is claimed is:

1. A damper with a trigger plate in which a sleeve made from a metal plate of a magnetic body, and an elastic body are interposed between a hub attached to a rotating shaft and an annular mass body arranged at an outer peripheral side of said hub,
    wherein one end portion of said sleeve is bent outwardly in a radial direction along an end surface of said annular mass body so as to form a collar portion,
    said trigger plate is magnetized at a predetermined pitch in a circumferential direction and is integrally provided on an outer surface of said collar portion of said sleeve,
    said trigger plate has magnetized layers made of a rubber-like elastic material or a synthetic resin material, in which fine magnetic powder is uniformly mixed, that are bonded through vulcanization on said outer surface of said collar portion of said sleeve at said predetermined pitch in said circumferential direction, and
    said magnetized layers have different magnetic poles alternately in the circumferential direction.

2. The damper with the trigger plate as claimed in claim 1, wherein said sleeve is fitted between an outer peripheral surface of a rim portion of said hub and an inner peripheral surface of said elastic body.

3. The damper with the trigger plate as claimed in claim 1, wherein said sleeve is fitted between an inner peripheral surface of said annular mass body and an outer peripheral surface of said elastic body.

4. The damper with the trigger plate as claimed in claim 1, wherein a curved surface depressed to an inner side in said radial direction is formed at an intermediate portion in an axial direction of an outer peripheral surface of said rim portion of said hub,
    a protruding portion expending to an inner side in said radial direction so as to correspond to said curved surface of said hub is formed at an intermediate portion in an axial direction of said sleeve, and
    said elastic body is attached between said hub and said sleeve.

5. A damper with a trigger plate in which a sleeve made from a metal plate of a magnetic body, and an elastic body are interposed between a hub attached to a rotating shaft and an annular mass body arranged at an outer peripheral side of said hub,
    wherein one end portion of said sleeve is bent inwardly in a radial direction along an end surface of a rim portion of said hub so as to form a collar portion,
    said trigger plate is magnetized at a predetermined pitch in a circumferential direction and is integrally provided on an outer surface of said collar portion of said sleeve, said trigger plate has magnetized layers made of a rubber-like elastic material or a synthetic resin material, in which fine magnetic powder is uniformly mixed, that are bonded through vulcanization on said outer surface of said collar portion of said sleeve at said predetermined pitch in said circumferential direction, and said magnetized layers have different magnetic poles alternately in the circumferential direction.

6. The damper with the trigger plate as claimed in claim 5, wherein a curved surface depressed to an outer side in said radial direction is formed at an intermediate portion in an axial direction of an inner peripheral surface of said annual mass body, a protruding portion expanding to an outer side in said radial direction so as to correspond to said curved surface of said annular mass body is formed at an intermediate portion in an axial direction of said sleeve, and said elastic body is attached between said annular mass body and said sleeve.

7. A damper with a trigger plate in which a sleeve made from a metal plate of a magnetic body, and an elastic body are interposed between a hub attached to a rotating shaft and an annular mass body arranged at an outer peripheral side of said hub, wherein one end portion of said sleeve is extended to inner and outer sides in an axial direction from an end surface of a rim portion of said hub so as to form a cylindrical end portion, said trigger plate is magnetized at a predetermined pitch in a circumferential direction and is integrally provided on an outer surface of said cylindrical end portion of said sleeve, said trigger plate has magnetized layers made of a rubber-like elastic material or a synthetic resin material, in which fine magnetic powder is uniformly mixed, that are bonded through vulcanization on said outer surface of said cylindrical end portion of said sleeve at said predetermined pitch in said circumferential direction, and said magnetized layers have different magnetic poles alternately in the circumferential direction.

* * * * *